United States Patent [19]

Apostolo

[11] Patent Number: 4,936,480
[45] Date of Patent: Jun. 26, 1990

[54] FISHERMAN'S BASKET

[76] Inventor: Mauricio C. Apostolo, 9034 SW. 132nd La., Miami, Fla. 33176

[21] Appl. No.: 278,745

[22] Filed: Dec. 2, 1988

[51] Int. Cl.$^5$ ............................................... B60R 9/10
[52] U.S. Cl. ...................................... 220/19; 224/319; 224/324; 224/42.03 A
[58] Field of Search ................ 224/319, 324, 42.03 A, 224/42.03 B, 42.13, 42.43, 42.46 R; 220/19

[56] References Cited

U.S. PATENT DOCUMENTS

| | | | |
|---|---|---|---|
| 2,287,531 | 5/1941 | Ong | 220/19 |
| 2,594,319 | 9/1950 | Law | 224/324 |
| 4,709,840 | 12/1987 | Allen | 224/42.03 B |

FOREIGN PATENT DOCUMENTS

| | | | |
|---|---|---|---|
| 961871 | 12/1948 | France | 224/42.46 R |
| 133091 | 5/1949 | Sweden | 224/42.46 R |

*Primary Examiner*—Stephen Marcus
*Assistant Examiner*—Gilbert W. Reece
*Attorney, Agent, or Firm*—Richard L. Miller

[57] ABSTRACT

This fisherman's basket is designed to be supported on a bicycle rack of an automobile, so as to store bait, fish, meat and other articles that may be odorous and not desired in the interior of the automobile. Primarily, it consists of a frame with wire mesh openings that provide for ventilation of the interior of the basket. A ventilated cover is also provided that can be locked, and apertures are provided through the frame of the basket for receiving the bicycle support arms of the bicycle rack mounted on the automobile.

1 Claim, 1 Drawing Sheet

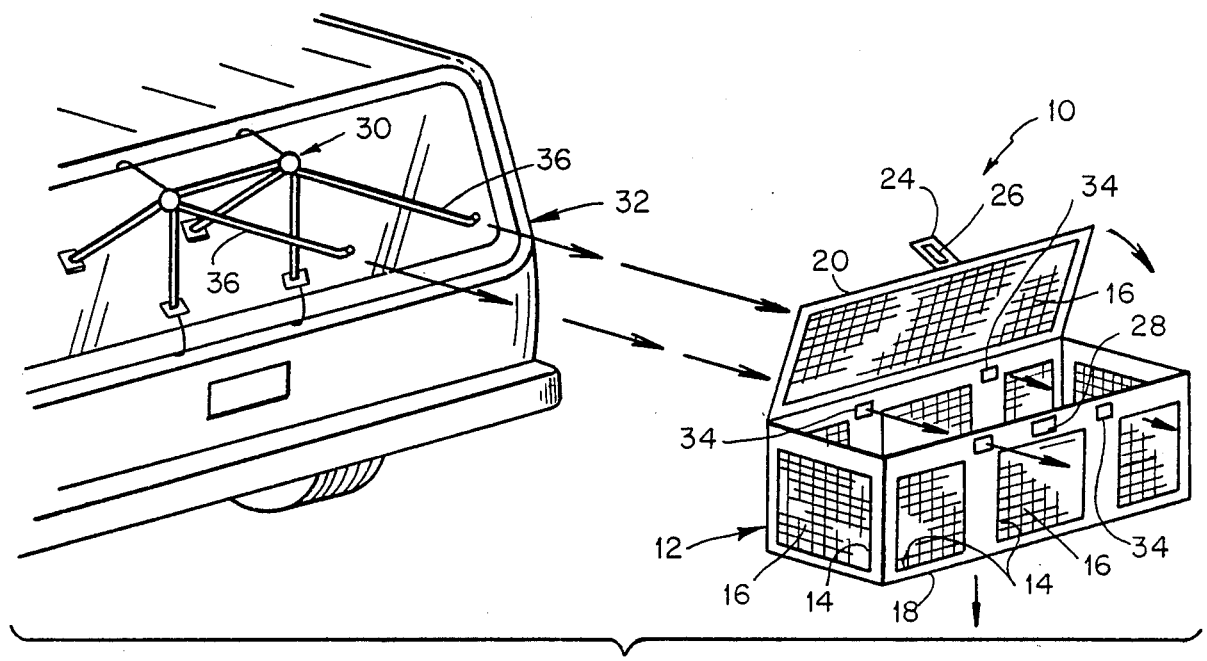
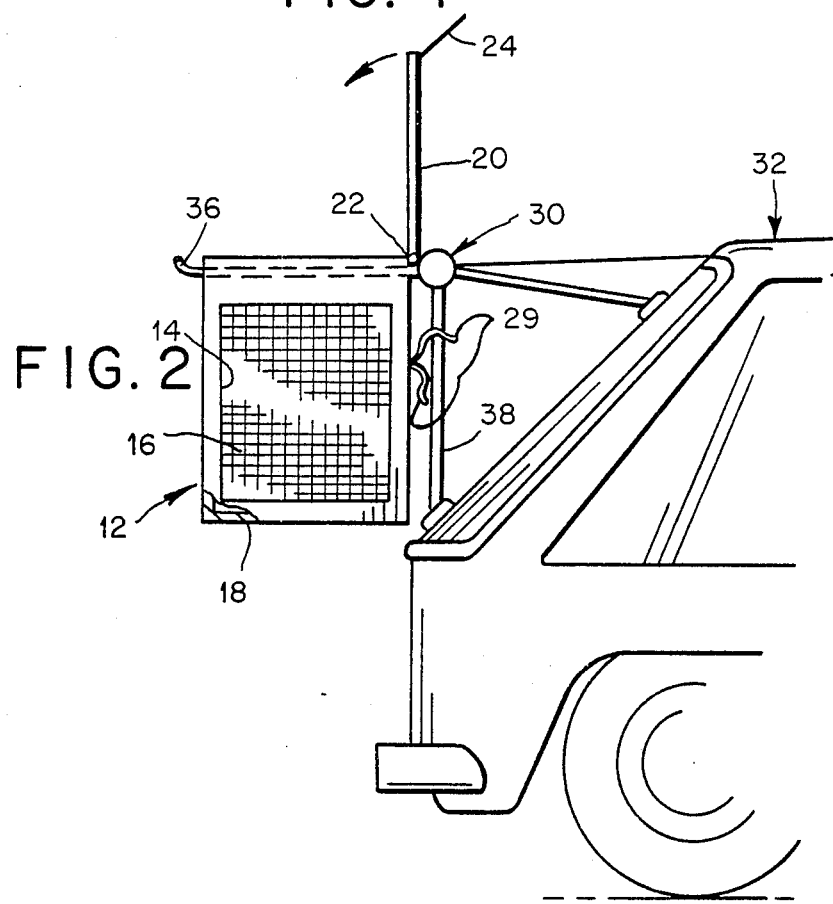

FISHERMAN'S BASKET

BACKGROUND OF THE INVENTION

The instant invention relates generally to basket devices for fishermen to carry their bait and catch on the outside of an auto vehicle in order to prevent unpleasant odors from polluting the air within the vehicle.

Numerous containers have been provided in the prior art that are adapted to store fish and meat. While these units may be suitable for the particular purpose to which they address, they would not be as suitable for the purpose of the present invention as hereafter described.

SUMMARY OF THE INVENTION

A primary object of the present invention is to provide a fisherman's basket that will overcome the shortcomings of the prior art devices.

Another object is to provide a fisherman's basket that will be of such design, as to hold such odorous items, as bait, fish, reels, and other articles on the exterior of an automotive vehicle.

An additional object is to provide a fisherman's basket that will be so designed, as to be removably supportable on any existing bicycle-type rack for vehicles.

A further object is to provide a fisherman's basket that is simple and easy to use.

A still further object is to provide a fisherman's basket that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The FIGURES in the drawings are briefly described as follows:

FIG. 1 is a diagrammatic perspective view of the instant invention showing the box removed therefrom;

FIG. 2 is a side view of a rear portion of a vehicle showing the instant invention installed thereon.

DETAILED DESCRIPTION OF THE PREFERRED EMBODIMENTS

Turning now descriptively to the drawings, in which like reference characters denote like elements throughout the several views, a basket 10 is shown to include a frame 12 having openings 14 through its sides and ends. Wire mesh screens 16 that are non-corrosive are fixedly secured in the openings 14 for ventilation, and a bottom wall 18 is fixedly secured to frame 12 for the support of bait, fish, meat, etc.

A pivotal cover 20 is provided and hinged to a top of a side of frame 12 by a pair of hinges 22, (one of which is shown). A clasp 24 with an opening 26 therein, is pivotally attached to one longitudinal edge of cover 20, for cooperating with an eye 28 on a front side of frame 12, the combination being provided for receiving a padlock or the like. A pair of straps 29 (one of which is shown), are secured to a rear portion of frame 12, in a manner (not shown), for a purpose which hereinafter will be described.

A conventional bicycle supporting rack 30 secured to an automotive vehicle 32, provides support for basket 10, and aligned openings 34 through the front and rear of the frame 12 of basket 10, freely receive the pair of arms 36 of the bicycle rack 30. The straps 29 are tied to the brace rods 38 of the rack 30 for retaining the basket 10 in place when the vehicle 32 is in motion.

In use, the basket 10 may be filled with bait, fish, meat or whatever, prior to lifting and pushing basket 10 onto the arms 36 of the rack 30. The cover 20 may be locked down by the placement of a lock through the hasp 24 and the eye 28.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fisherman's basket which comprises:
   a frame, having openings provided through said frame, for removably receiving a pair of support arms of a bicycle supporting rack attached to an automotive vehicle;
   mesh screens secured in said frame, providing ventilation for contents of said basket; and
   means attached to said frame for securing said frame to said bicycle supporting rack, wherein a pair of openings are spaced apart from each other and are through top portions of a front wall and a rear wall of said basket, and the openings freely receive said pair of arms of said rack, and said arms support said basket in elevation behind said automotive vehicle, wherein said means attached to said frame for securing said frame to said bicycle supporting rack is a strap which can be tied to said rack whereby said fisherman's basket is prevented from dislodging from said rack and when said automotive vehicle is in motion.

* * * * *